United States Patent Office 3,108,089
Patented Oct. 22, 1963

3,108,089
NONDRYING ALKYD RESINS, AND AMINE-FORMALDEHYDE RESIN COATING COMPOSITIONS PLASTICIZED THEREWITH
Louis L. Ferstandig, El Cerrito, Calif., assignor to California Research Corporation, San Francisco, Calif., a corporation of Delaware
No Drawing. Filed Sept. 23, 1960, Ser. No. 57,881
9 Claims. (Cl. 260—45.3)

The present invention relates to the preparation of novel alkyd resins. More particularly, the invention has to do with the preparation of alkyd resins of the nondrying type. These resins are useful in lacquers, e.g., with nitrocellulose, and as heat convertible polyesters suitable for plasticizing amino plastic resins, e.g., urea-formaldehyde and melamine-formaldehyde resins.

Typical alkyd resins of the prior art for the above uses are conventionally prepared by reacting phthalic acid, a polyol, i.e., a polyhydric alcohol of at least three hydroxyl groups, generally the triol glycerol, with (1) nondrying oils, e.g., coconut, or (2) a fatty acid to produce an oil-modified alkyd resin. In the first process, the polyol is usually reacted with the desired oil in the presence of an esterification catalyst, and the resulting monoglyceride then reacted with the remainder of the ingredients (the monoglyceride process). The "fatty acid process" can be effected by heating all of the ingredients at once. (See pages 287-292 of volume I of Organic Coating Technology, by H. F. Payne, John Wiley & Sons, 1954.)

A typical alkyd resin will have an oil length of the order of 30 to 35%, by weight of the final resin, calculated as triglyceride, and an excess of hydroxyl groups of the order of 4 to 6 polyol units per 100 parts by weight of alkyd. As is known, these resins can be modified in a number of different ways to effect the desired properties, such as oil length, hydroxyl number, and the like. Thus, a portion of the dibasic acid can be replaced with a monobasic acid, an aliphatic dibasic acid, e.g., adipic, or by the use of other phthalic acids, or substituted phthalic acids. Similarly, in addition to the triol, e.g., glycerol or trimethylolethane, a glycerol, a monohydric alcohol or other polyhydric alcohols, e.g., pentaerythritol, sorbitol and mannitol can be used. In general, these various modifying alcohols are used in very small proportions as compared with the amount of triol employed. The resulting alkyd can then be used as varnish vehicles or mixed with nitrocellulose for lacquer applications or mixed with melamine or urea-formaldehyde resins (usually of the order of 70 parts alkyd to 30 parts of the melamine or urea resin), which, upon heating, the amine-formaldehyde resin cross-links with the alkyd resin to form a hard enamel film that is heat and color stable.

By way of further illustration, the polyester backbone or structure of the nondrying alkyd resin may be represented as follows, wherein "PA" stands for a phthalic acid residue with terminal hydroxyl and carboxyl groups:

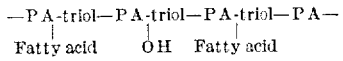

In accordance with the present invention, novel and superior nondrying alkyd resins can be prepared by replacing the fatty acid monoglyceride with a particular glycol or mixtures of these glycols hereinafter more fully described. Thus, in accordance with the present invention, the skeletal polyester backbone of the alkyd resin can be illustrated as follows:

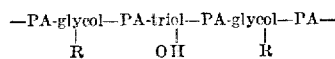

PA and R standing, respectively, for a phthalic acid residue and a glycol substituent group of high carbon content, the terminal valences being satisfied by hydroxyl and carboxyl groups.

As can be seen from the foregoing formula, the glycol replaces the expensive mixture of high-grade fatty acid and triol and also eliminates an ester group for each fatty acid monoglyceride replaced. In addition, it has been found that the alkyds prepared pursuant to the invention have improved hardness. Hardness specifications on the finished enamel in large part determine the amount of the very hard amine resin needed. Thus, when the alkyd contributes significantly to the hardness of the finished film, less of the expensive amine resin is needed. Similar considerations apply to lacquers. The novel alkyds of this invention, therefore, minimize the need for expensive hardening agents.

The glycol material employed in accordance with the present invention to replace the fatty acid-monoglyceride portion of conventional nondrying alkyds (derived from the monoglyceride or fatty acid process) can generally be characterized as a glycol or mixture of glycols having a saturated side or pendant hydrocarbon structure or chain of a total of 4 to 18 carbon atoms, preferably 8 to 15 carbon atoms, the hydroxyl groups of the glycol, moreover, being attached to primary or secondary carbon atoms and preferably to at least one primary carbon, the glycol thus being free of a tertiary hydroxyl group. In other words, a satisfactory glycol can be defined as a monoalkyl substituted ethylene glycol, in which the alkyl group contains 4 to 18 carbon atoms, i.e., from 1,2-hexane diol to 1,2-eicosane diol.

The new alkyd resin of the invention is the esterification reaction product obtained by heating together the aforesaid 1,2-glycol material, a triol, such as glycerol, trimethylolethane, trimethylolpropane; a phthalic acid material, such as phthalic anhydride, isophthalic acid, terephthalic acid or 5-t-butyl isophthalic acid, and other derivatives as shown, for example, in U.S. Patents No. 2,627,508 and 2,895,932. Heating is sufficiently high to drive off water, temperatures of the order of 350° to 500° F. being satisfactory. Heating is continued until a resin having the desired properties is obtained, namely an acid number below 50 and a suitable viscosity, for example, M to Z (Gardner-Holdt) when the resin is diluted with 50% by weight of xylene. As is known in the art, a solvent may be employed in the esterification reaction, the solvent serving to form azeotropes with the water, and thereby aiding in its removal. Certain petroleum fractions, such as toluene or xylene, usually employed in an amount of less than 10% by weight of the reactants, can be cited as examples. Moreover, if desired, the esterification reaction may be catalyzed by acids or acid salts soluble in the reaction mixture, for example, p-toluene sulfonic acid or triphenyl phosphite. The whole operation may be effected in conventional cooking vessels or kettles of any suitable size, equipped with adequate heating and stirring means, openings for charging the ingredients, sampling the product, and, if desired, to exclude oxidative effects of the air, provided with inlets and outlets for the passage of an inert gas.

In the preparation of the oil-less alkyd resin, as above described, the relative proportions of the reactants can be varied over a wide range. In general, the amount of triol will be at least about 5 mol percent, and the 1,2-glycol at least about 15 mol percent depending upon the oil length desired or more appropriately the "glycol content," hereinafter defined. The phthalic acid content will vary from about 50 mol percent downward, depending on the choice of glycol content. A sufficient amount of triol is employed to react with all of the carboxyl groups not reacted with the glycol. Since it is preferred to have free hydroxyl groups in the finished resin and a low acid number, i.e., below 50, and preferably about 15 to 20, the combined amounts of triol and 1,2-glycol is such as to give an excess of hydroxyl over carboxyl groups. Accordingly, an excess of triol and glycol equivalent of, say, 3 to 10% over the acid material is generally employed.

In the following examples, the acid and hydroxyl numbers are determined in conventional manner. The glycol content [1] for the resins was maintained constant at around 30% so that the hardness measurements reflect an intrinsic property of the resin. The hardness can, of course, be varied by changing the glycol content just as hardness is varied in conventional resins by modifying oil length.

The equipment employed is a cylindrical reaction vessel provided with a stirrer, condenser, nitrogen inlet, and column for the removal of water and the retention of other volatile materials. The vessel is heated in an oil bath maintained between 375° to 450° F. throughout the reaction period. During the early part of the run, the reaction is kept at the lower temperature in order to inhibit the escape of volatile materials other than water. Towards the end of reaction, the temperature is raised to facilitate the removal of the last traces of water. A nitrogen blanket is maintained over the reactants during the course of reaction. When the reaction is deemed complete, for example, when the reaction product has the desired acid number, the reaction mixture is cooled, xylene is added to make a solution containing 50% nonvolatile material, the 50% solution filtered under pressure, and the filtrate analyzed for acid number, hydroxyl number and viscosity.

In order to show the superior hardness of the alkyd resins prepared in accordance with the invention, a 50% solution of the alkyd resin in xylene is mixed with a 50% solution in xylene of either a urea-formaldehyde or a melamine-formaldehyde resin, prepared as described, for example, in U.S. Patent No. 2,437,657, in the ratio of 85 parts of alkyd solution to 15 parts of amine-formaldehyde solution. Films of 0.003-inch thickness are cast on plate glass with a doctor blade. The films are dried at ambient conditions for at least 15 minutes and then baked at 125° C. for one hour. The baked films or enamels are then measured for hardness.

Example 1

A mixture of 1,2-dodecanediol (52.5 grams), trimethylolethane (12.0 grams), 1,2-propanediol (25.2 grams), and isophthalic acid (104.5 grams) was heated together with stirring from a temperature of 310° to 425° F. over a four-hour period and then cooked at 425° F. for a four-hour period. The final resin had an acid number of 12.0 and a Gardner color (50% nonvolatile in xylene) of 2.

A baking enamel was prepared from this resin by mixing it with melamine-formaldehyde in the ratio of 85:15. This was then mixed with titanium dioxide in the ratio of 100:80. Films prepared from the diluted enamel had a Sward hardness 56% of glass, zero yellowness (tristimulus method) and showed 99% gloss (specular reflection, 60° gloss).

Example 2

0.0543 mol of 1,2-nonanediol, 0.0625 mol of isophthalic acid and 0.0120 mol of trimethylolethane are heated to cause reaction and remove water in the equipment above described. Upon analysis, the resin has a hydroxyl number of 97, and an acid number of 21.3. The resin is diluted to 50% with xylene and then mixed in the ratio of 85:15 with a 50% solution of a melamine-formaldehyde resin. Films of a thickness of 0.003-inch are cast on glass and baked. The Sward hardness in percent of glass is determined to be 48. A similar test using a urea-formaldehyde resin results in a hardness of 42% of glass.

Example 3

When using the procedure as outlined in Example 2 with 0.0479 mol of 1,2-decanediol replacing the 1,2-nonanediol and the trimethylolethane being present in an amount of 0.0162 mol, a resin having an acid number of 21.9 and a hydroxyl number of 105 is obtained. On testing for hardness, there are obtained a film hardness of 44% of glass for the urea-formaldehyde formulation and a hardness of 52% of glass for the melamine-formaldehyde formulation.

Example 4

Following the procedure as outlined in Example 2, there are employed 0.0430 mol of 1,2-undecanediol, 0.0166 mol of trimethylolethane and 0.0046 mol of propylene glycol to keep the glycol content constant. Upon completion of the reaction a resin is obtained having a viscosity of M (Gardner-Holdt) in a 50% xylene solution. The hardness in the urea-formaldehyde formulation is 46%; in the melamine-formaldehyde formulation, 52%.

Example 5

Following the procedure as outlined in Example 2, but substituting 0.0387 mol of 1,2-dodecanediol and using 0.0172 mol of trimethylolethane and adding 0.0081 mol of propylene glycol, a resin is obtained having an acid number of 17.5 and a viscosity of a 50% solution in xylene of X. The hardness for the urea-formaldehyde formulation is 44%, and for the melamine-formaldehyde formulation, 52%.

Example 6

Following the procedure as outlined in Example 2, using 0.0356 mol of 1,2-tridecanediol, 0.0151 mol of trimethylolethane and 0.0143 mol of propylene glycol, a resin having a hydroxyl number of 88, an acid number of 18.3 and a viscosity of a 50% solution in xylene of V is obtained. Upon formulation, with urea-formaldehyde and melamine-formaldehyde, the films have a hardness of 40% and 46%, respectively.

Example 7

Following the procedure as outlined in Example 2, but substituting 0.0086 mol each of 1,2-nonanediol, 1,2-decanediol, 1,2-undecanediol, 1,2-dodecanediol, and 1,2-tridecanediol for the 1,2-nonanediol and 0.0166 mol of trimethylolethane and adding 0.0046 mol of propylene glycol, a satisfactory viscous resin is obtained. Upon testing as above, the urea-formaldehyde and melamine-formaldehyde combinations result in very hard films.

Example 8

Following the procedure as outlined in Example 2, but substituting 0.026 mol of lauric acid for the 1,2-nonanediol and using 0.0437 mol of trimethylolethane and adding 0.0205 mol of propylene glycol, a resin having an acid number of 18.4 is obtained. The amino plastic resin combinations made with urea-formaldehyde and melamine-formaldehyde both have hardnesses of 17% of glass.

Example 9

Following the procedure as outlined in Example 2, but substituting 0.0625 mol of phthalic anhydride for isophthalic acid and 0.012 mol of glycerol for trimethylolethane, a satisfactory resin for hard films is obtained.

Example 10

A purchased resin 2A-272 (coconut oil and phthalic anhydride, a product of General Electric Co.) with an acid number of 11 and an oil length of 34% is mixed with urea-formaldehyde and melamine-formaldehyde in

---

[1] The glycol content, which is related to oil length normally used in conventional resins, of the resins prepared in accordance with the invention, employing long-chain glycol in place or monoglyceride was determined by this definition:

$$\text{Glycol content} = \frac{Gl \cdot Msc}{MGL \cdot R} \times 100$$

wherein:
Gl = glycol used, in grams
Msc = molecular weight of glycol side chain
MGL = molecular weight of glycol
R = Resin weight in grams calculated on complete reaction basis the ratio of 85:15 for each. The former gives a film that is 21% the hardness of glass, and the latter, 25%.

In addition to producing resin having superior hardness characteristics, the use of the herein-contemplated 1,2-glycols, such as 1,2-nonanediol, has the advantage as opposed to other glycol material, for example, the 1,3-glycols, such as 2-ethyl-2-butyl-1,3-propanediol, of expediting the esterification reaction with consequent economic benefit, in some instances the rate of reaction being as much as 40% faster.

Often, as hereinabove indicated, acid catalysts are used to promote the rate of esterification. These work quite well in facilitating the esterification of 1,2-glycols. However, in the esterification of other glycol materials, such as the 2,2-dialkyl 1,3-glycols, acids have a serious, deleterious effect. The color changes quickly from pale yellow to black. This is probably due to carbonium ion rearrangements of the neopentyl structure which can be generated from these glycols and their esters by acids. Not only does the color suffer under such conditions, but the rearrangements are accompanied in part by a loss of hydroxyl groups to generate a monohydroxyl residue in place of the original dihydroxy material. In an alkyd resin, this means a reduction in the molecular weight by rupture of the resin backbone. This type of acid sensitivity will affect the properties of the finished resin in the presence of acid in a similar way.

This application is a continuation-in-part of copending application Serial No. 667,981, filed June 25, 1957, now abandoned.

I claim:

1. A nondrying alkyd resin suitable for plasticizing aminoplast resins and as a vehicle for varnishes and lacquers which is the reaction product of a saturated aliphatic trihydric alcohol, phthalic acid, and a saturated monoalkyl substituted ethylene glycol having 4 to 18 carbon atoms in the alkyl group.

2. Composition according to claim 1, wherein the phthalic acid is isophthalic acid.

3. Composition according to claim 1, wherein the alkyl group of the glycol has 8 to 15 carbon atoms.

4. Composition according to claim 3, wherein the trihydric alcohol is selected from the group consisting of glycerol, trimethylolethane and trimethylolpropane.

5. Composition according to claim 4, wherein the phthalic acid is isophthalic acid.

6. A formaldehyde amine resin coating composition plasticized with an alkyd which is the reaction product of a saturated aliphatic trihydric alcohol, a phthalic acid and a saturated monoalkyl substituted ethylene glycol having 4 to 18 carbon atoms in the alkyl group.

7. Process for the preparation of an alkyd resin suitable for plasticizing aminoplast resins which comprises esterifying at a temperature in the range 350° to 500° F. a mixture of a saturated aliphatic trihydric alcohol, a phthalic acid and a saturated monoalkyl substituted ethylene glycol to a resin having an acid number below 50, the glycol having 4 to 18 carbon atoms in the alkyl group.

8. Process according to claim 7, wherein the phthalic acid is isophthalic acid and the alkyl group of the glycol has 8 to 15 carbon atoms.

9. Process according to claim 8, wherein the trihydric alcohol is selected from the group consisting of glycerol, trimethylolethane and trimethylolpropane.

References Cited in the file of this patent

UNITED STATES PATENTS 2,936,296     Precopio et al. _____ May 10, 1960

UNITED STATES PATENT OFFICE
CERTIFICATE OF CORRECTION

Patent No. 3,108,089                  October 22, 1963

Louis L. Ferstandig

It is hereby certified that error appears in the above numbered patent requiring correction and that the said Letters Patent should read as corrected below.

Column 1, line 42, for "glycerol" read -- glycol --; column 3, line 4 of footnote 1, for "or" read -- of --.

Signed and sealed this 28th day of April 1964.

(SEAL)
Attest:

ERNEST W. SWIDER                  EDWARD J. BRENNER

Attesting Officer                  Commissioner of Patents